US012681908B2

(12) United States Patent
Nguyen et al.

(10) Patent No.: US 12,681,908 B2
(45) Date of Patent: Jul. 14, 2026

(54) EFFICIENT INTEGER PROGRAMMING SEARCH FOR MATCHING ENTITIES USING MACHINE LEARNING

(71) Applicant: SAP SE, Walldorf (DE)

(72) Inventors: Hoang-Vu Nguyen, Leimen (DE);
Stefan Klaus Baur, Heidelberg (DE);
Matthias Frank, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/407,082

(22) Filed: Jan. 8, 2024

(65) Prior Publication Data

US 2025/0225115 A1 Jul. 10, 2025

(51) Int. Cl.
*G06F 16/215* (2019.01)
*G06F 16/21* (2019.01)
*G06F 16/23* (2019.01)

(52) U.S. Cl.
CPC .......... *G06F 16/215* (2019.01); *G06F 16/213* (2019.01); *G06F 16/2365* (2019.01)

(58) Field of Classification Search
CPC .. G06F 16/215; G06F 16/213; G06F 16/2365; G06F 16/21; G06F 16/235
See application file for complete search history.

(56) References Cited

U.S. PATENT DOCUMENTS

| | | |
|---|---|---|
| 11,615,120 B2 | 3/2023 | Baur et al. |
| 11,687,575 B1 | 6/2023 | Nguyen et al. |

| | | | |
|---|---|---|---|
| 2011/0078695 A1* | 3/2011 | Agarwala | G06Q 30/04 |
| | | | 718/104 |
| 2019/0130050 A1* | 5/2019 | Haas | G06F 16/90344 |
| 2019/0188561 A1* | 6/2019 | Tang | G06N 3/08 |
| 2020/0097604 A1* | 3/2020 | Lee | G06N 3/08 |
| 2020/0372016 A1* | 11/2020 | Rogynskyy | G06Q 10/10 |
| 2021/0216881 A1* | 7/2021 | McCarthy | G06N 3/042 |
| 2022/0247638 A1* | 8/2022 | Engi | G06N 20/00 |
| 2022/0345543 A1* | 10/2022 | Oleinikov | G06F 16/313 |
| 2023/0229993 A1* | 7/2023 | Yang | G06Q 10/06315 |
| | | | 705/7.16 |

(Continued)

FOREIGN PATENT DOCUMENTS

| | | |
|---|---|---|
| CN | 112330246 | 2/2021 |

OTHER PUBLICATIONS

"Solving Constraint Integer Programs", [Online]. Retrieved from the Internet: URL: https: www.scipopt.org , (accessed on Jan. 1, 2024), 11 pgs.

(Continued)

*Primary Examiner* — Amy Ng
*Assistant Examiner* — Dustin D Eyers
(74) *Attorney, Agent, or Firm* — SCHWEGMAN LUNDBERG & WOESSNER, P.A.

(57) ABSTRACT

In an example embodiment, a solution for matching entities in a query table with one or more entities in a target table, in the presence of a constraint on the value sum of the matching targets (hereinafter called the "value constraint"), using machine learning techniques, is provided. Specifically, a non-linear objective function is converted to a linear objective function and a machine learning model is trained using the linear objective function, allowing for the use of solver functions from libraries in order to speed matching over existing methods.

20 Claims, 6 Drawing Sheets

(56)　　　　　References Cited

U.S. PATENT DOCUMENTS

2025/0124295 A1*　4/2025　Mukherjee ............ G06F 40/289

OTHER PUBLICATIONS

"A python Linear Programming API", [Online]. Retrieved from the Internet:URL: https: github.com coin-or pulp, (accessed on Dec. 11, 2023), 4 pgs.

"European Application Serial No. 24209838.2, Extended European Search Report mailed Apr. 3, 2025", 12 pgs.

Zhou, Nan, "Generating Multi-label Adversarial Examples by Linear Programming", 2020 International Joint Conference on Neural Networks IJCNN, IEEE, DOI 10.1109 IJCNN48605.2020. 9206614m [retrieved on Sep. 25, 2020], Jul. 19, 2020, 8 pgs.

* cited by examiner

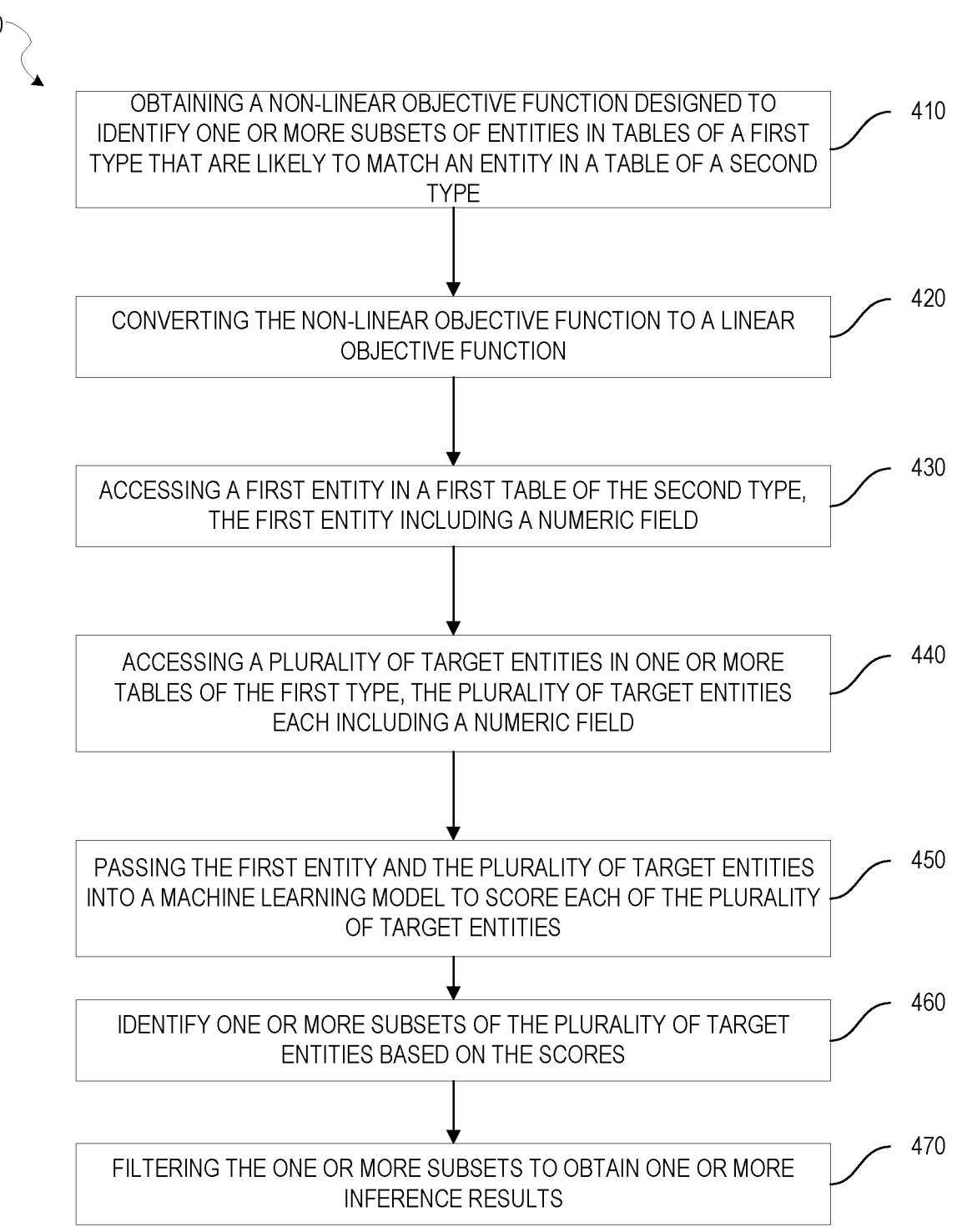

400

OBTAINING A NON-LINEAR OBJECTIVE FUNCTION DESIGNED TO IDENTIFY ONE OR MORE SUBSETS OF ENTITIES IN TABLES OF A FIRST TYPE THAT ARE LIKELY TO MATCH AN ENTITY IN A TABLE OF A SECOND TYPE — 410

CONVERTING THE NON-LINEAR OBJECTIVE FUNCTION TO A LINEAR OBJECTIVE FUNCTION — 420

ACCESSING A FIRST ENTITY IN A FIRST TABLE OF THE SECOND TYPE, THE FIRST ENTITY INCLUDING A NUMERIC FIELD — 430

ACCESSING A PLURALITY OF TARGET ENTITIES IN ONE OR MORE TABLES OF THE FIRST TYPE, THE PLURALITY OF TARGET ENTITIES EACH INCLUDING A NUMERIC FIELD — 440

PASSING THE FIRST ENTITY AND THE PLURALITY OF TARGET ENTITIES INTO A MACHINE LEARNING MODEL TO SCORE EACH OF THE PLURALITY OF TARGET ENTITIES — 450

IDENTIFY ONE OR MORE SUBSETS OF THE PLURALITY OF TARGET ENTITIES BASED ON THE SCORES — 460

FILTERING THE ONE OR MORE SUBSETS TO OBTAIN ONE OR MORE INFERENCE RESULTS — 470

*FIG. 4*

EFFICIENT INTEGER PROGRAMMING SEARCH FOR MATCHING ENTITIES USING MACHINE LEARNING

TECHNICAL FIELD

This document generally relates to machine learning. More specifically, this document relates to a deep neural network for matching entities in semi-structured data.

BACKGROUND

Databases commonly store data in tables, with each row representing a different entity. Entities may be any element in a data set, including, for example, users, documents, organizations, locations, etc.; however, in many types of data storage each row in the table corresponds to a different entity. If the table is, for example, a table of documents, then each row represents a different document.

BRIEF DESCRIPTION OF DRAWINGS

The present disclosure is illustrated by way of example and not limitation in the figures of the accompanying drawings, in which like references indicate similar elements.

FIG. 4 is a flow diagram illustrating a method for matching an entity in tables in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One issue that can arise in data storage is an inability to match entities across multiple tables. For example, it may be difficult to determine whether an entity in one table is the same entity as listed in another table, as the data stored in the respective tables may not be normalized and thus the different tables may be storing information about the same entity in two different ways. A product catalog intended for consumers, for example, may contain information about a product that is stored in a different format than the same information in a product catalog intended for component suppliers. Likewise, a table containing incoming payments from customers may relate to an invoice in a separate table of invoices.

This problem can occur in areas other than data storage as well. For example, in some systems it is desirable to match invoices with shipping records, and failing to do so accurately can be detrimental.

In some instances, it can be beneficial to identify matches between the entities in different tables in order to reconcile the two different formats of information. In other instances, this matching can be used to deduplicate entities that are not intended to be listed twice to reduce storage size.

In an example embodiment, a solution for matching entities in a query table with one or more entities in a target table, in the presence of a constraint on the value sum of the matching targets (hereinafter called the "value constraint"), using machine learning techniques, is provided. As a concrete example, consider a table containing incoming payments (a.k.a. bank statement records) and a second table with outgoing invoices. The value constraint requires that the amount sum of matching invoices is close to the bank statement amount. In enterprise finance applications, finding the set of matching invoices to each bank statement satisfying the value constraint is a labor-intensive manual task.

Figure 1:
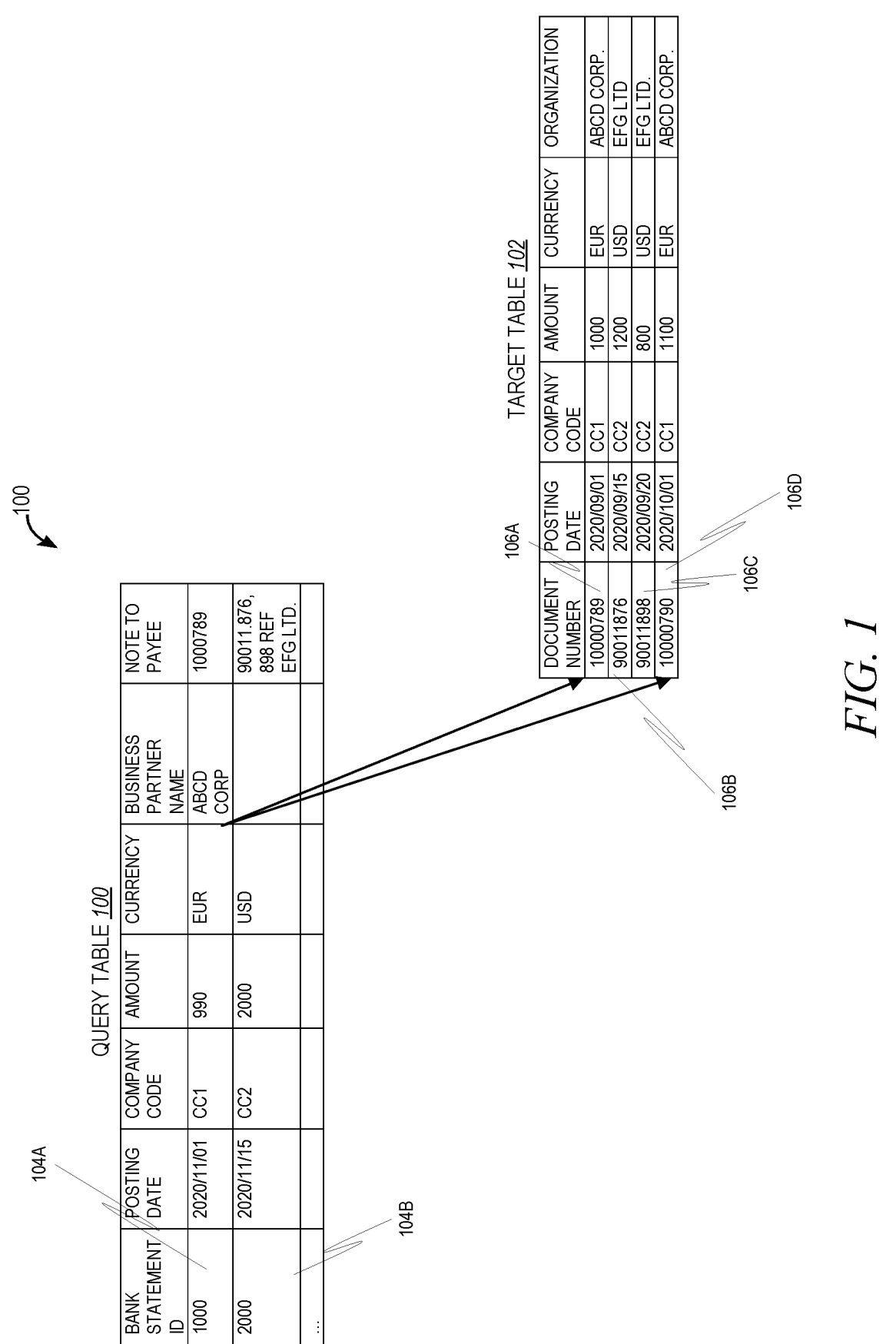
FIG. 1 is a diagram illustrating an example of a query table and a target table, in accordance with an example embodiment.

FIG. 1 is a diagram illustrating an example of a query table 100 and a target table 102, in accordance with an example embodiment. Here, the query table 100 stores information about bank statements 104A, 104B while the target table 102 stores information about accounts receivable documents 106A, 106B, 106C, 106D. Bank statement 104A could conceivably be related to either accounts receivable document 106A or 106D (or both) as both originate from ABCD Corporation, but there may be ambiguity as to which one of these relate, and there is also the potentially inefficient search to identify 106A and 106D as being potentially related to bank statement 104A in the first place.

Similar problems also arise in other business contexts, such as in logistics, where one needs to find for each purchase order (query) a set of matching records on incoming physical shipments (targets), under the constraint that the quantity of the received goods adds up to the purchased number of goods.

Formally, the problem can be formulated as follows: for each query $\vec{q}$ from query table, let $T = \{\vec{t}_1, \ldots, \vec{t}_N\}$ be a set of targets from target table that constitute matching candidates to $\vec{q}$, e.g., sets of invoices having the same company code with the underlying bank statement. A goal is to find a subset of targets $T_S \subseteq T$ having maximal matching score to $\vec{q}$ (computed by a score function $f$) and satisfying the value constraint. In many use cases, such as Cash Application or Returnable Packaging Management, there exist a numeric field a in query table and a numeric field b in target table. The value constraint requires that $|\vec{q} \cdot a - \Sigma_{\vec{t} \in T_S} \vec{t} \cdot b| \leq \in$ where $\in \geq 0$ reflects a small tolerance. There are two reasons to introduce a non-zero tolerance E: it can account for floating-point errors in cases where exact computation would yield 0; and, there can also be circumstances in the business process that require a tolerance, for example in the finance domain, where currency conversions at slightly differing rates may be involved.

It may be assumed that $\vec{t} \cdot b \neq 0$ for all $\vec{t} \in T$; this can be achieved by filtering out in advance all $\vec{t} \in T$ where $\vec{t} \cdot b = 0$.

Mathematically, the search problem can be formulated as solving $$\operatorname*{argmax}_{T_s \subseteq T \setminus \{\emptyset\}} f(\vec{q}, T_s)$$

subject to $$\left| \vec{q} \cdot a - \sum_{\vec{t} \in T_s} \vec{t} \cdot b \right| \leq \epsilon$$

Here $f(\vec{q}, T_S)$ quantifies the match score between $\vec{q}$ and all targets in $T_S$, the higher it is the better. One way to define $f$ is to train a machine learning/deep learning model on historical data. In practice, training a model that can score the similarity between $\vec{q}$ and target subset $T_S$ of an arbitrary size is infeasible in terms of both data preprocessing, memory, and runtime. Another practice is to assume the targets are statistically independent; $f(\vec{q}, T_S)$ consequently can be decomposed into a combination (e.g., product, sum, mean) of individual match scores $g(\vec{q}, \vec{t})$ where $\vec{t}$ is a target and g is a model scoring the similarity between $\vec{q}$ and $\vec{t}$. In this disclosure, the following definition may be used:

$$f(\vec{q}, T_s) = \frac{1}{|T_s|} \sum_{t \in T_s} g(\vec{q}, \vec{t})$$

In summary, the following may be solved:

$$\operatorname*{argmax}_{T_s \subseteq T \setminus \{\emptyset\}} \frac{1}{|T_s|} \sum_{\vec{t} \in T_s} g(\vec{q}, \vec{t})$$

subject to $$\left| \vec{q} \cdot a - \sum_{\vec{t} \in T_s} \vec{t} \cdot b \right| \leq \epsilon$$

For the optimization problem above, one possible solution is to exhaustively enumerate all subsets of T and select the subset with the best match score to $\vec{q}$. As this is exponential to |T|, it is applicable when |T| is small, e.g., |T|≤20. When |T| is large, a more scalable algorithm is needed.

In the following, an alternative is provided that performs a search that efficiently explores the search space and avoids the expensive task of enumerating all subsets. This is accomplished by formulating the original optimization problem to equivalent forms that enable the application of mixed integer programming. Then, existing mixed integer programming solver libraries such as SCIP, Gurobi, CPLEX, and PuLP can be used to efficiently search for the best matching subset of targets.

Recall that $T = \{\vec{t}_1, \ldots, \vec{t}_N\}$ and let $p_i = g(\vec{q}, \vec{t}_i)$. Each subset of invoices can be characterized by a binary sequence $n_1, \ldots, n_N$ where $n_i = 1$ indicates target $\vec{t}_i$ is included in the subset, and 0 otherwise.

The optimization problem becomes solving $$\operatorname*{argmax}_{n_1, n_1, \ldots, n_N} \frac{\sum_{i=1}^{N} n_i \cdot p_i}{\sum_{i=1}^{N} n_i}$$

subject to the value constraint $$\left| \vec{q} \cdot a - \sum_{i=1}^{N} n_i \cdot \vec{t}_i \cdot b \right| \leq \epsilon$$

and the non-empty subset constraint $$\sum_{i=1}^{N} n_i \geq 1$$

Since the objective function $$\frac{\sum_{i=1}^{N} n_i \cdot p_i}{\sum_{i=1}^{N} n_i}$$

is non-linear, which is generally not optimal to be used in existing mixed integer programming libraries, the optimization problem is converted into one of two different equivalent formulations.

In the first formulation, the objective function is used as a constraint. Here, an auxiliary variable, z, is defined which lower bounds the original objective function. Maximizing z thus means maximizing the function.

Specifically, the following is solved:

$$\operatorname*{argmax}_{n_1, n_2, \ldots, n_N} z$$

subject to $$\frac{\sum_{i=1}^{N} n_i \cdot p_i}{\sum_{i=1}^{N} n_i} \geq z$$

and $$\left| \vec{q} \cdot a - \sum_{i=1}^{N} n_i \cdot \vec{t}_i \cdot b \right| \leq \epsilon$$

and $$\sum_{i=1}^{N} n_i \geq 1$$

Here the absolute constraint can be represented by two linear constraints; for readability, they may be combined into one. Note also that the new objective function is linear and thus solvable by mixed integer programming libraries. To improve the fact that the first constraint is non-linear, another formulation is introduced which has both linear objective function and linear constraints.

Here

Let $p_{min} = \min\{p_1, p_2, \ldots, p_N\}$ and $p_{max} = \max\{p_1, p_2, \ldots, p_N\}$.

Let $y = \frac{\sum_{i=1}^{N} n_i \cdot p_i}{\sum_{i=1}^{N} n_i}$. Then $\sum_{i=1}^{N} y \cdot n_i = \sum_{i=1}^{N} n_i \cdot p_i$. Let $z_i = y \cdot n_i$ then it holds:

$$n_i \cdot p_{min} \leq z_i \leq n_i \cdot p_{max}$$

and $$y - p_{max} \cdot (1 - n_i) \leq z_i \leq y - p_{min} \cdot (1 - n_i)$$

In summary, the following is solved:

$$\underset{n_1, n_2, \ldots, n_N}{\text{argmax}} \; y$$

subject to $$\sum_{i=1}^{N} z_i = \sum_{i=1}^{N} n_i \cdot p_i$$

and $$n_i \cdot p_{min} \leq z_i \leq n_i \cdot p_{max} (\forall \, i \in [1, N])$$

and $$y - p_{max} \cdot (1 - n_i) \leq z_i \leq y - p_{min} \cdot (1 - n_i)(\forall \, i \in [1, N])$$

and $$\left| \vec{q}.a - \sum_{i=1}^{N} n_i \cdot \vec{t}_i.b \right| \leq \epsilon$$

and $$\sum_{i=1}^{N} n_i \geq 1$$

In the second formulation, both the objective function and the constraints are linear, making it potentially easier to solve by related libraries.

Figure 2:
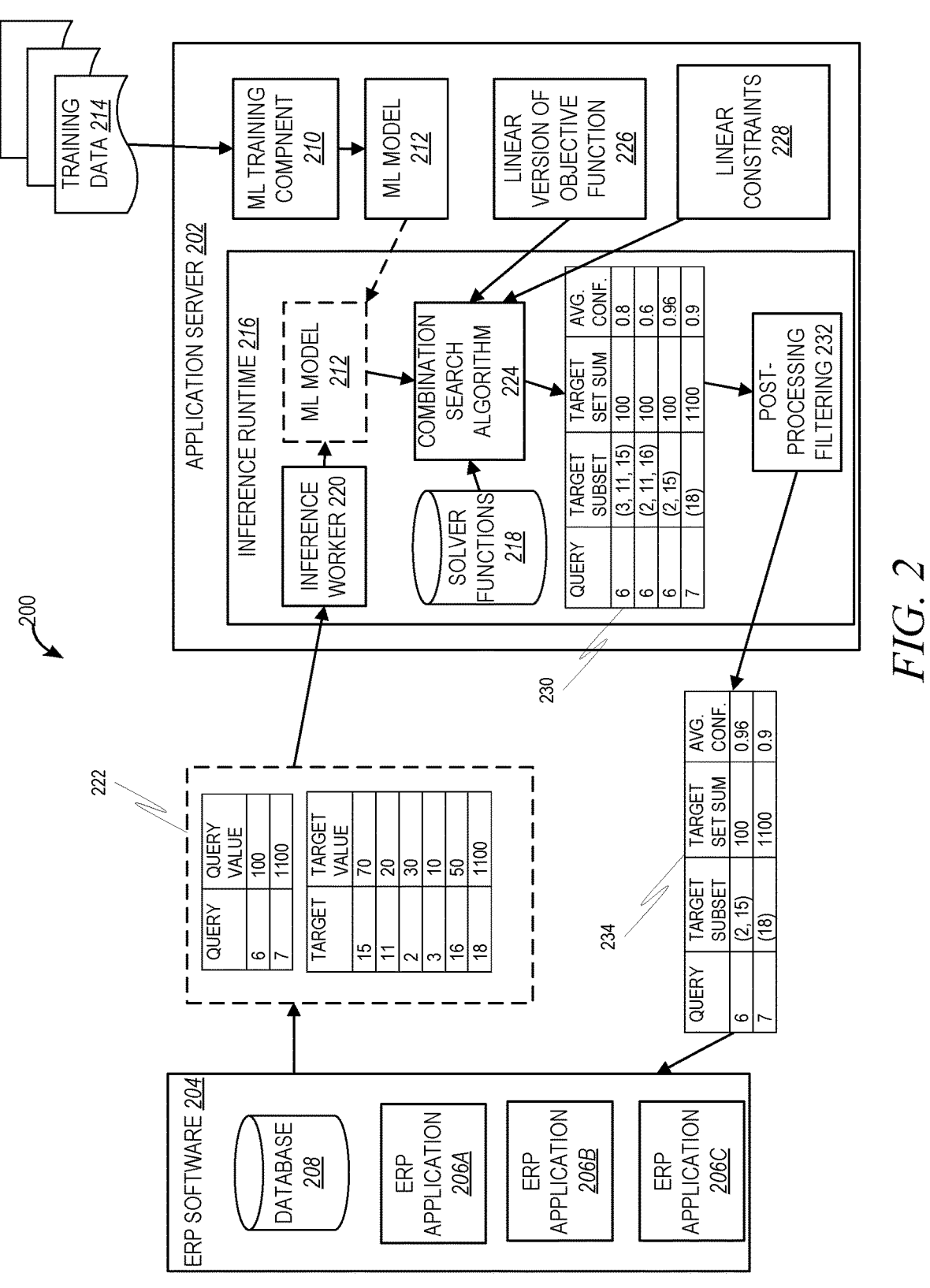
FIG. 2 is a block diagram illustrating a system for using machine learning to match entities in tables, in accordance with an example embodiment.

FIG. 2 is a block diagram illustrating a system 200 for using machine learning to match entities in tables, in accordance with an example embodiment. Here, an application server 202 runs a series of components to perform the matching. In some example embodiments, the application server 202 may be cloud-based. Enterprise Resource Planning (ERP) software 204 stores a plurality of tables, including tables that, for purposes of this disclosure, will be considered to be query tables and target tables. ERP software integrates processes used to run an organization, such as finance, manufacturing, human resources, supply chain, services, procurement, and others into a single system various. These processes typically provide intelligence, visibility, and efficiency across most if not all aspects of an organization. One Example of ERP software is SAP® S/4 HANA from SAP SE of Walldorf, Germany.

More particularly, ERP software 204 runs one or more ERP applications 206A, 206B, 206C, each of which can read from or write to tables in a database 208. In some example embodiments, the database 208 is an in-memory database, which is a database in which data is persisted in the main memory (e.g., Random Access Memory) of a computer system as opposed to on a disk such as a hard drive.

Application server 202 may operate a machine learning training component 210. The machine learning training component 210 acts to train a machine learning model 212 to score similarity of entities. This training may use training data 214, which may be sample tables with entities having labels identifying matches (either complete, i.e., one-to-one matches, or partial matches, such as where a single payment corresponds to several different invoices, or vice-versa).

The machine learning model 212 may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning training component 210 used to train the machine learning model 212 may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the machine learning model 212 may take place as a dedicated training phase. In other example embodiments, the machine learning model 212 may be retrained dynamically at runtime by a user providing live feedback.

At some point, one or more of the ERP applications 206A, 206B, 206C, or another application not pictured, may indicate a desire to identify entities in one or more target tables that match one or more entities in a query table. As such, an inference runtime 216 is launched on the application server 202. The inference runtime is loaded with the machine learning model 212 as well as one or more solver functions 218 (such as from one or more libraries). At least some of these solver functions either require or run more efficiently on either linear optimization problems, linear constraints, or both. Examples of such libraries include SCIP and PULP.

An inference worker 220 in the inference runtime 216 obtains inference data 222 from the database 208. This inference data 222 is then passed through the machine learning model 212, which outputs model predictions with confidence scores. This includes matching pairs of target and query, which can then be passed to the combination search algorithm 224. The combination search algorithm 224 utilizes a linear version 226 of an objective function and optionally linear constraints 228 and then uses one or more of the solver functions 218 to solve that linear version 226 of an objective function and optionally linear constraints 228. The result is matched subsets 230. Here, for example, query item 7 has 18 as the only matching subset, whereas query item 6 has three different potential matching subsets (the first being (3, 11, 15), the second being (2, 11, 16), and the third being (2, 15)). The combination search algorithm 224 also returns the average confidence valued of the corresponding set, based on the confidence values returned by the machine learning model 212. Optionally, post processing filtering 232 filters out the sets having average confidence values below a configured threshold. The results 234 may then be passed back to the ERP software 204.

In an example embodiment, the machine learning model 212 is a deep neural network that may be utilized to determine matches between candidate pairs of entities, as well as confidence scores that reflect how certain the deep neural network is about the corresponding match. The deep neural network is also able to find these matches without requiring domain knowledge that would be required if features for a machine-learned model were handcrafted, which is a drawback of prior art machine-learned models used to match entities in multiple tables. Indeed, in some instances it may be impossible for a user to define a universal set of engineered features (such as where the semantics and exact usage of terminology may vary across countries and across organizations), making prior art techniques unusable. Thus, the deep neural network improves on the functioning of prior art machine-learned models designed to perform the same tasks. Specifically, the deep neural network learns the relationships of tabular fields and the patterns that define a match from historical data alone, making this approach generic and applicable independent of the context.

The tables themselves may be considered semi-structured. Some fields in the tables may contain structured data (i.e., they have a clear type, such as dates/numerical values such as amounts, volumes, and quantities, or categorical values, such as country or currency codes). Other fields in the tables are unstructured text-type fields, such as item descriptions, reference numbers, bank statement memo notes, company names, etc.). While for some of these text fields formatting conventions may exist, the data in the fields is typically entered by users and thus the content may vary substantially. For example, a bank transfer payment memo field may or may not contain an invoice number, reference numbers may or may not have leading zeroes, company names may or may not contain the city of the company, etc. These unstructured fields often carry the bulk of the information necessary to find matching entities.

More particularly, in an example embodiment, a deep neural network is utilized as the machine learning model, and trained in such a way that domain knowledge of the meanings of fields in the tables or the relationships between fields in the tables are not needed during training.

Figure 3:
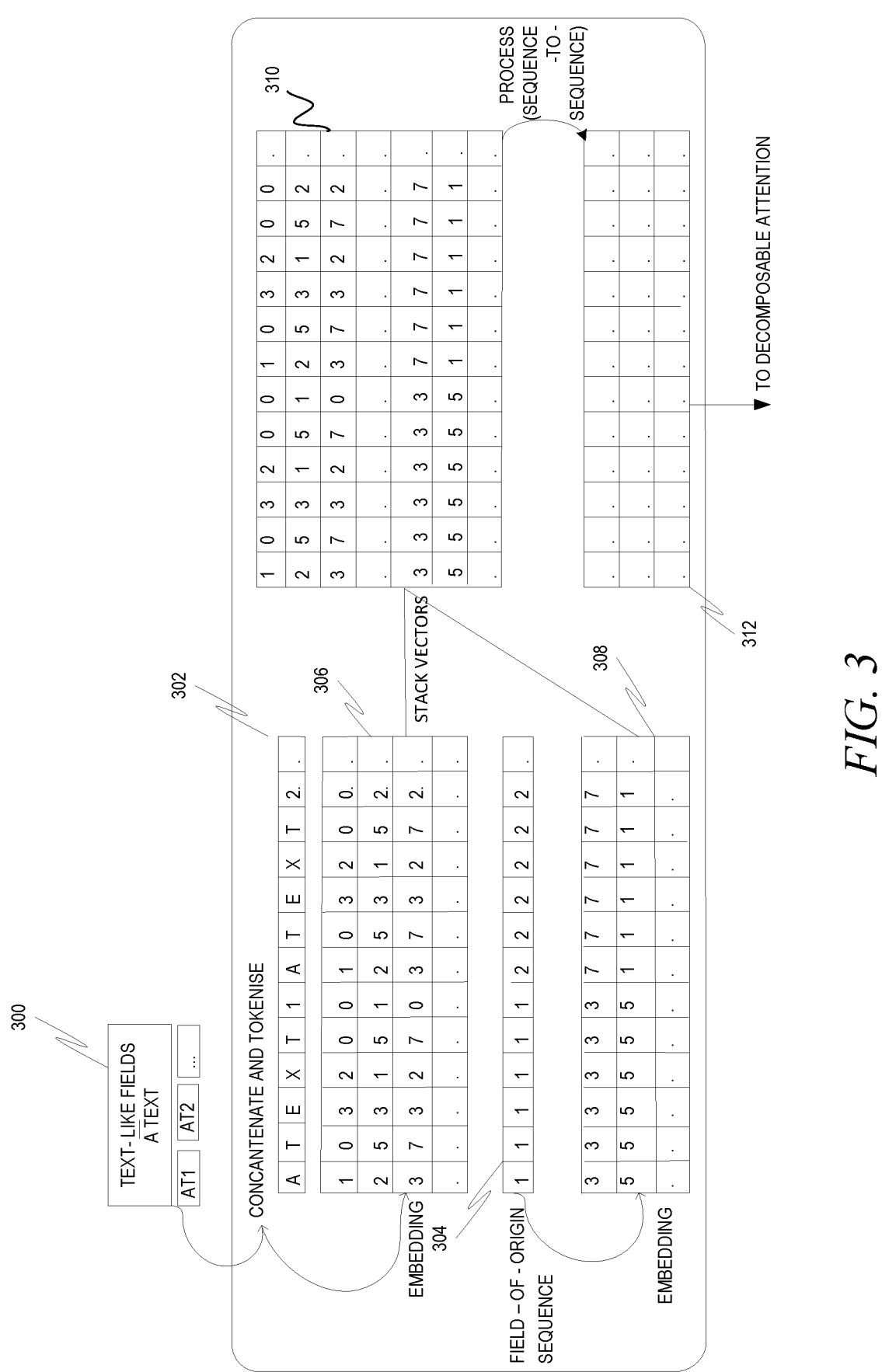
FIG. 3 is a diagram illustrating an example of sequence processing operations in accordance with an example embodiment.

FIG. 3 is a diagram illustrating an example of sequence processing operations in accordance with an example embodiment. This figure depicts how text-like fields 300 of an entity are tokenized and concatenated into a first sequence 302 and then a second sequence 304 is generated indicating the field position of the fields in which the corresponding tokens reside. Both the first sequence 302 and the second sequence 304 are then mapped to embeddings 306 and 308, respectively. The embeddings 306 and 308, which may be stored as matrices, are then stacked together and aligned into matrix 310. The sequence-to-sequence module then outputs the k'-dimensional vectors 312.

The k'-dimensional vectors a and b (identical with the vectors 312) are then passed to a decomposable attention and aggregation component, which operates as follows:

The core model comprises the following three components, which are trained jointly:

Attend. First, soft-align the elements of $\bar{a}$ and $\bar{b}$ using a variant of neural attention and decompose the problem into the comparison of aligned subphrases.

Compare. Second, separately compare each aligned subphrase to produce a set of vectors $$\{v_{1,i}\}_{i=1}^{\ell_a}$$

for a and $$\{v_{2,j}\}_{j=1}^{\ell_b}$$

for b. Each $v_{1,i}$ is a nonlinear combination of $a_i$ and its (softly) aligned subphrase in b (and analogously for $v_{2,j}$).

Aggregate. Finally, aggregate the sets

8

$$\{v_{1,i}\}_{i=1}^{\ell_a} \text{ and } \{v_{2,j}\}_{j=1}^{\ell_b}$$

de from the previous $\hat{y}$ [08] .

We first obtain unnormalized attention weights $e_{ij}$, computed by a function F', which decomposes as:

$$e_{ij} := F'(\bar{a}_i, \bar{b}_j) := \bar{a}_i^T \cdot \bar{b}_j \left( = [F_A(a)]_i^T \cdot [F_B(b)]_j \right).$$

This decomposition avoids the quadratic complexity that would be associated with separately applying $F'1_a \times 1_b$ times. Instead, only $1_a + 1_b$ applications of $F_{A/B}$ are needed. These attention weights are normalized as follows:

$$\beta_i := \sum_{j=1}^{\ell_b} \frac{\exp(e_{ij})}{\sum_{k=1}^{\ell_b} \exp(e_{ik})} \bar{b}_j,$$

$$\alpha_j := \sum_{i=1}^{\ell_{ba}} \frac{\exp(e_{ij})}{\sum_{k=1}^{\ell_{ba}} \exp(e_{kj})} \bar{a}_i.$$

Here $\beta_i$ is the subphrase in $\bar{b}$ that is (softly) aligned to $\bar{a}_i$ and vice versa for $\alpha_j$.

Next, the aligned phrases $$\{(\bar{a}_i, \beta_i)\}_{i=1}^{\ell_a} \text{ and } \{(\bar{b}_i, \alpha_j)\}_{j=1}^{\ell_b}$$

are separately compared using a function G, which is again a feed-forward network:

$$v_{1,i} := G([\bar{a}_i, \beta_i]) \quad \forall i \in [1, \dots, \ell_a],$$

$$v_{2,j} := G([\bar{b}_j, \alpha_j]) \quad \forall j \in [1, \dots, \ell_b].$$

where the brackets [•,•] denote concatenation. Note that since there is only a linear number of terms in this case, there is no need to apply a decomposition as was done in the previous step. Thus, G can jointly take into account both $\bar{a}_i$, and $\beta_i$.

There are now two sets of comparison vectors:

$$\{v_{1,i}\}_{i=1}^{\ell_a} \text{ and } \{v_{2,j}\}_{j=1}^{\ell_b}.$$

First, the system may aggregate over each set by some sort of pooling, such as average, max pooling, or summation:

$$v_1 = \sum_{i=1}^{\ell_a} v_{1,i}, \; v_2 = \sum_{j=1}^{\ell_b} v_{2,j}.$$

and feed the result through a final classifier H, which is a feed forward network followed by a linear layer:

$$\hat{y} = H([v_1, v_2]),$$

where $\hat{y} \in \mathbb{R}^C$ represents the predicted (unnormalized) scores for each class and consequently the predicted class is given by $\hat{y}=\text{argma}_i\hat{y}_i$.

For training, a multi-class cross-entropy loss with dropout regularization may be used:

$$L(\theta_F, \theta_G, \theta_H) = \frac{1}{N}\sum_{n=1}^{N}\sum_{c=1}^{C} l_c^{(n)} \log \frac{\exp(\hat{y}_c)}{\sum_{c'=1}^{C} \exp(\hat{y}_{c'})}$$

Here $\theta_F$, $\theta_G$, $\theta_H$ denote the learnable parameters of the functions $F_{A/B}$, G and H, respectively.

FIG. 4 is a flowchart of an example method for matching entities in tables, in accordance with an example embodiment. At operation 410, a non-linear objective function designed to identify one or more subsets of entities in tables of a first type that are likely to match an entity in a table of a second type is obtained. At operation 420, the non-linear objective function is converted to a linear objective function.

At operation 430, a first entity in a first table of the second type is accessed. The first entity includes a numeric field. At operation 440, a plurality of target entities in one or more tables of the first type are accessed. The plurality of target entities each include a numeric field.

At operation 450, the first entity and the plurality of target entities are passed into a machine learning model to produce a score for each of the plurality of target entities. This score is representative of a likelihood that the corresponding target entity is to match the first entity. At operation 460, the scores are used by a combination search algorithm to identify one or more subsets of the plurality of target entities that are likely to match the first entity. At operation 470, the one or more subsets are filtered to obtain one or more inference results.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application. Example 1 is a system comprising: at least one hardware processor; and a non-transitory computer-readable medium storing instructions that, when executed by the at least one hardware processor, cause the at least one hardware processor to perform operations comprising: obtaining a non-linear objective function designed to identify one or more subsets of entities in tables of a first type that are likely to match an entity in a table of a second type; converting the non-linear objective function to a linear objective function; accessing a first entity in a first table of the second type, the first entity including a numeric field; accessing a plurality of target entities in one or more tables of the first type, the plurality of target entities each including a numeric field; passing the first entity and the plurality of target entities into a machine learning model to produce a similarity score corresponding to each of one or more of the target entities; identifying, using the linear objective function, one or more subsets of the one or more target entities that are likely to match the first entity, based on the score of each of the one or more target entities; and filtering the one or more subsets to obtain one or more inference results.

In Example 2, the subject matter of Example 1 includes, wherein the machine learning model produces, for each likely matching subset, an average confidence score indicative of a likelihood that a corresponding subset matches the first entity.

In Example 3, the subject matter of Examples 1-2 includes, wherein a sum of the numeric fields of the target entities in each of the subsets is within a threshold amount of the numeric field of the first entity.

In Example 4, the subject matter of Examples 1-3 includes, wherein the converting includes creating a formulation that maximizes an auxiliary variable, the auxiliary variable being a lower bounds of the non-linear objective function.

In Example 5, the subject matter of Examples 1-4 includes, wherein the converting includes converting both the non-linear objective function to a linear objective function and converting non-linear constraints of the non-linear objective function to linear constraints of the linear objective function.

In Example 6, the subject matter of Examples 1-5 includes, wherein the passing further includes using a solver function contained in a software library to perform calculations on output of the machine learning model.

In Example 7, the subject matter of Examples 1-6 includes, wherein the first table of the second type and the one or more tables of the first type are stored in an Enterprise Resource Planning (ERP) system.

Example 8 is a method comprising: obtaining a non-linear objective function designed to identify one or more subsets of entities in tables of a first type that are likely to match an entity in a table of a second type; converting the non-linear objective function to a linear objective function; accessing a first entity in a first table of the second type, the first entity including a numeric field; accessing a plurality of target entities in one or more tables of the first type, the plurality of target entities each including a numeric field; passing the first entity and the plurality of target entities into a machine learning model to produce a similarity score corresponding to each of one or more of the target entities; identifying, using the linear objective function, one or more subsets of the one or more target entities that are likely to match the first entity, based on the score of each of the one or more target entities; and filtering the one or more subsets to obtain one or more inference results.

In Example 9, the subject matter of Example 8 includes, wherein the machine learning model produces, for each likely matching subset, an average confidence score indicative of a likelihood that a corresponding subset matches the first entity.

In Example 10, the subject matter of Examples 8-9 includes, wherein a sum of the numeric fields of the target entities in each of the subsets is within a threshold amount of the numeric field of the first entity.

In Example 11, the subject matter of Examples 8-10 includes, wherein the converting includes creating a formulation that maximizes an auxiliary variable, the auxiliary variable being a lower bounds of the non-linear objective function.

In Example 12, the subject matter of Examples 8-11 includes, wherein the converting includes converting both the non-linear objective function to a linear objective function and converting non-linear constraints of the non-linear objective function to linear constraints of the linear objective function.

In Example 13, the subject matter of Examples 8-12 includes, wherein the passing further includes using a solver function contained in a software library to perform calculations on output of the machine learning model.

In Example 14, the subject matter of Examples 8-13 includes, wherein the first table of the second type and the one or more tables of the first type are stored in an Enterprise Resource Planning (ERP) system.

Example 15 is a non-transitory machine-readable medium storing instructions which, when executed by one or more processors, cause the one or more processors to perform operations comprising: obtaining a non-linear objective function designed to identify one or more subsets of entities in tables of a first type that are likely to match an entity in a table of a second type; converting the non-linear objective function to a linear objective function; accessing a first entity in a first table of the second type, the first entity including a numeric field; accessing a plurality of target entities in one or more tables of the first type, the plurality of target entities each including a numeric field; passing the first entity and the plurality of target entities into a machine learning model to produce a similarity score corresponding to each of one or more of the target entities; identifying, using the linear objective function, one or more subsets of the one or more target entities that are likely to match the first entity, based on the score of each of the one or more target entities; and filtering the one or more subsets to obtain one or more inference results.

In Example 16, the subject matter of Example 15 includes, wherein the machine learning model produces, for each likely matching subset, an average confidence score indicative of a likelihood that a corresponding subset matches the first entity.

In Example 17, the subject matter of Examples 15-16 includes, wherein a sum of the numeric fields of the target entities in each of the subsets is within a threshold amount of the numeric field of the first entity.

In Example 18, the subject matter of Examples 15-17 includes, wherein the converting includes creating a formulation that maximizes an auxiliary variable, the auxiliary variable being a lower bounds of the non-linear objective function.

In Example 19, the subject matter of Examples 15-18 includes, wherein the converting includes converting both the non-linear objective function to a linear objective function and converting non-linear constraints of the non-linear objective function to linear constraints of the linear objective function.

In Example 20, the subject matter of Examples 15-19 includes, wherein the passing further includes using a solver function contained in a software library to perform calculations on output of the machine learning model.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 5:
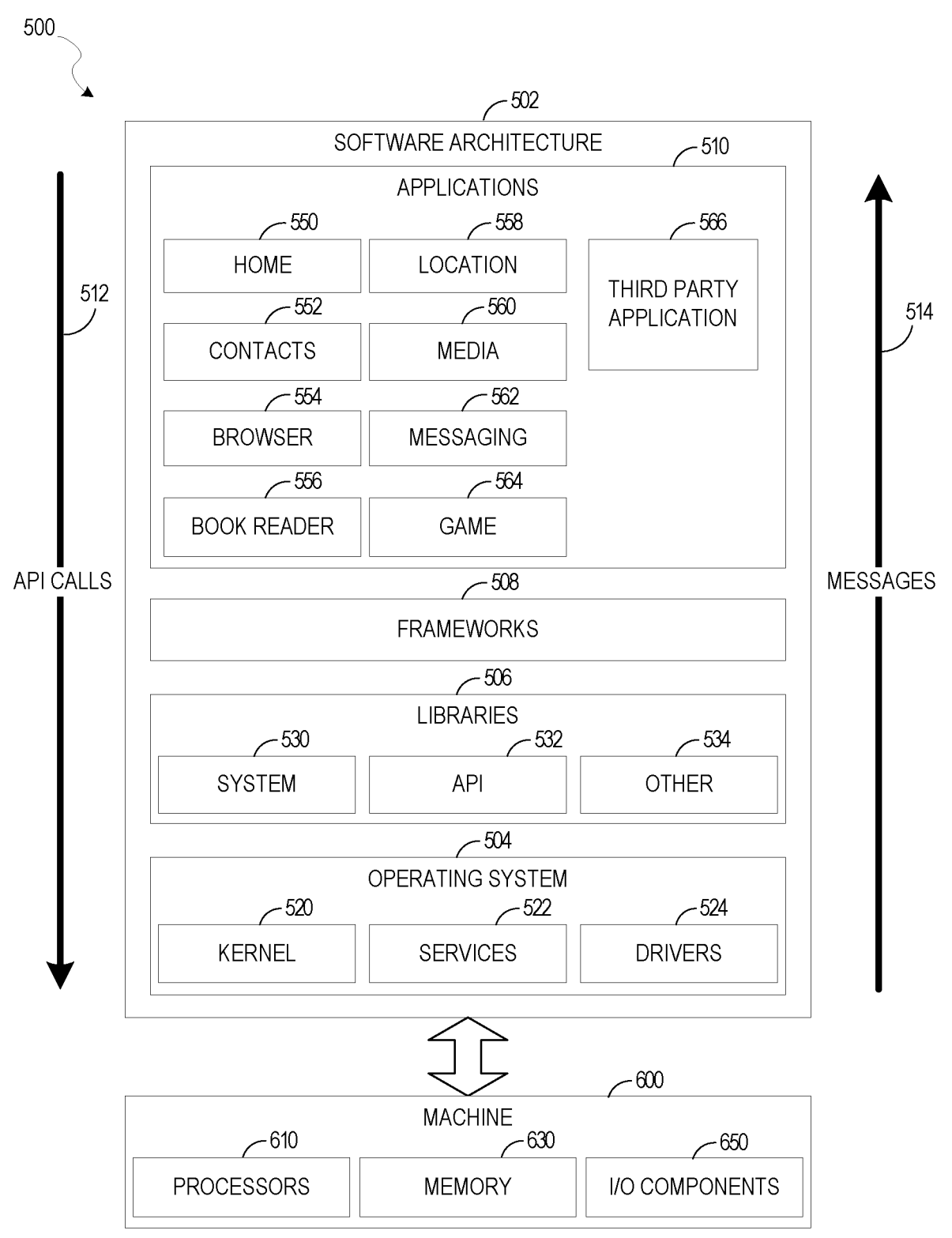
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus [USB] drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 [MPEG4], Advanced Video Coding [H.264 or AVC], Moving Picture Experts Group Layer-3 [MP3], Advanced Audio Coding [AAC], Adaptive Multi-Rate [AMR] audio codec, Joint Photographic Experts Group [JPEG or JPG], or Portable Network Graphics [NG]), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
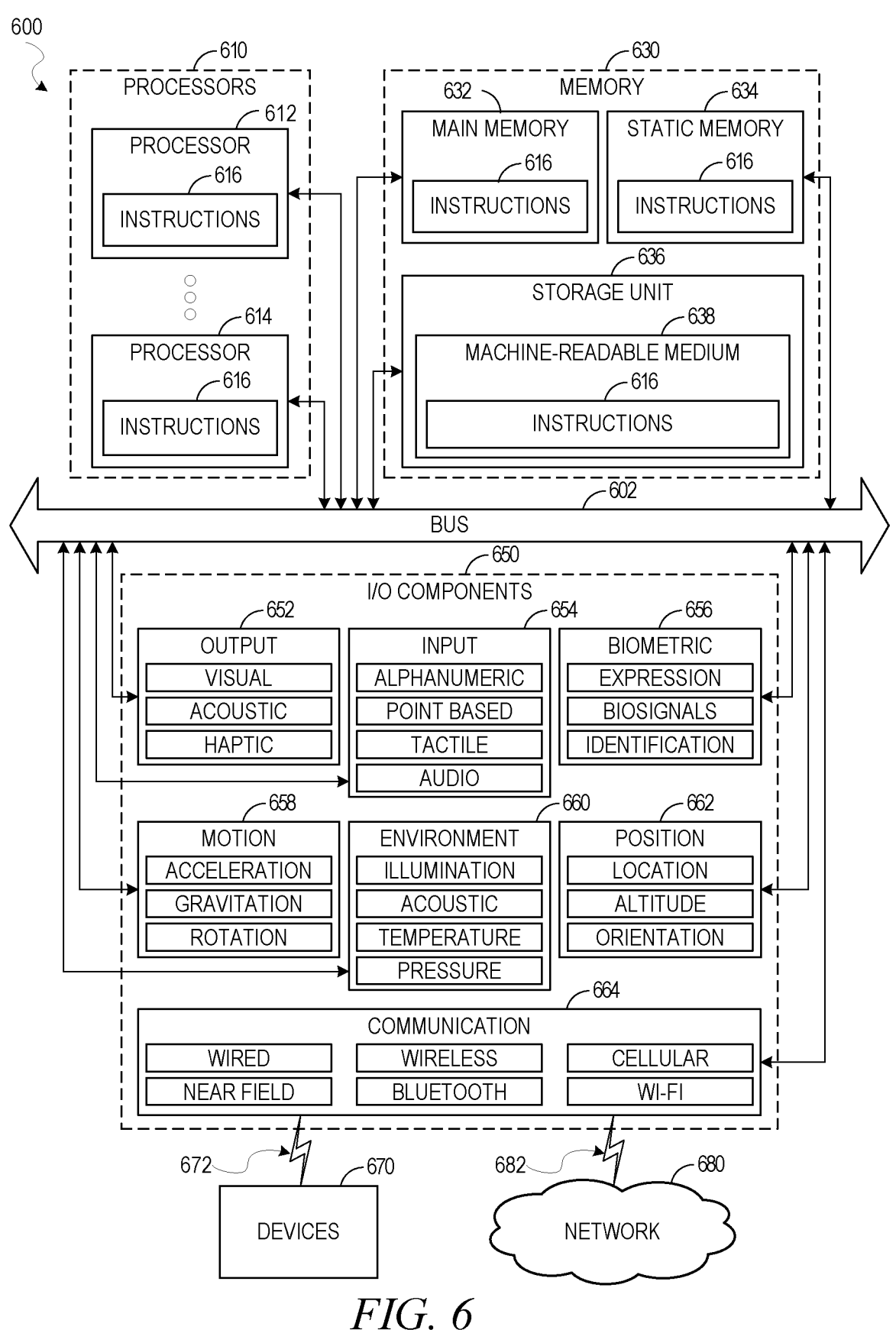
FIG. 6 illustrates a diagrammatic representation of a machine in the form of a computer system within which a set of instructions may be executed which causes the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel [PDP], a light-emitting diode [LED] display, a liquid crystal display [LCD], a projector, or a cathode ray tube [CRT]), acoustic components (e.g., speakers, haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 580 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a non-transitory computer-readable medium storing instructions that, when executed by the at least one hardware processor, cause the at least one hardware processor to perform operations comprising:

obtaining a non-linear objective function designed to identify one or more subsets of entities containing numeric fields in tables of a first type that are likely to match an entity containing a numeric field in a table of a second type, wherein the tables of the first type store numeric data in a different format than the table of the second type;

converting the non-linear objective function to a linear objective function;

accessing a first entity in a first table of the second type, the first entity including a numeric field;

accessing a plurality of target entities in one or more tables of the first type, the plurality of target entities each including a numeric field;

executing, using a computer system, a neural network on the first entity and the plurality of target entities to produce a similarity score corresponding to each of one or more of the target entities, the similarity score indicating similarity of one or more numeric fields of a corresponding target entity to one or more numeric fields of the first entity, the neural network comprising an attend component decompose a problem into aligned subphrases, a compare component trained to compare the aligned subphrases, and an aggregate component trained to aggregate sets, and the neural network trained by jointly training the attend component, the compare component, and the aggregate component, the jointly training causing the attend component, the compare component, and the aggregate component to jointly learn relationships between numerical fields of tables of the first table and numerical fields of tables of the second type;

identifying, using the linear objective function, one or more subsets of the one or more target entities that are likely to match the first entity, based on the similarity score of each of the one or more target entities; and filtering the one or more subsets to obtain one or more inference results.

2. The system of claim 1, wherein the neural network produces, for each likely matching subset, an average confidence score indicative of a likelihood that a corresponding subset matches the first entity.

3. The system of claim 1, wherein a sum of the numeric fields of the target entities in each of the subsets is within a threshold amount of the numeric field of the first entity.

4. The system of claim 1, wherein the converting includes creating a formulation that maximizes an auxiliary variable, the auxiliary variable being a lower bounds of the non-linear objective function.

5. The system of claim 1, wherein the converting includes converting both the non-linear objective function to a linear objective function and converting non-linear constraints of the non-linear objective function to linear constraints of the linear objective function.

6. The system of claim 1, wherein the executing further includes using a solver function contained in a software library to perform calculations on output of the neural network.

7. The system of claim 1, wherein the first table of the second type and the one or more tables of the first type are stored in an Enterprise Resource Planning (ERP) system.

8. A method comprising:

obtaining a non-linear objective function designed to identify one or more subsets of entities containing numeric fields in tables of a first type that are likely to match an entity containing a numeric field in a table of a second type, wherein the tables of the first type store numeric data in a different format than the table of the second type;

converting the non-linear objective function to a linear objective function;

accessing a first entity in a first table of the second type, the first entity including a numeric field;

accessing a plurality of target entities in one or more tables of the first type, the plurality of target entities each including a numeric field;

executing, using a computer system, a neural network on the first entity and the plurality of target entities to produce a similarity score corresponding to each of one or more of the target entities, the similarity score indicating similarity of one or more numeric fields of a corresponding target entity to one or more numeric fields of the first entity, the neural network comprising an attend component decompose a problem into aligned subphrases, a compare component trained to compare the aligned subphrases, and an aggregate component trained to aggregate sets, and the neural network trained by jointly training the attend component, the compare component, and the aggregate component, the jointly training causing the attend component, the compare component, and the aggregate component to jointly learn relationships between numerical fields of tables of the first table and numerical fields of tables of the second type;

identifying, using the linear objective function, one or more subsets of the one or more target entities that are likely to match the first entity, based on the similarity score of each of the one or more target entities; and filtering the one or more subsets to obtain one or more inference results.

9. The method of claim 8, wherein the neural network produces, for each likely matching subset, an average confidence score indicative of a likelihood that a corresponding subset matches the first entity.

10. The method of claim 8, wherein a sum of the numeric fields of the target entities in each of the subsets is within a threshold amount of the numeric field of the first entity.

11. The method of claim 8, wherein the converting includes creating a formulation that maximizes an auxiliary variable, the auxiliary variable being a lower bounds of the non-linear objective function.

12. The method of claim 8, wherein the converting includes converting both the non-linear objective function to a linear objective function and converting non-linear constraints of the non-linear objective function to linear constraints of the linear objective function.

13. The method of claim 8, wherein the executing further includes using a solver function contained in a software library to perform calculations on output of the neural network.

14. The method of claim 8, wherein the first table of the second type and the one or more tables of the first type are stored in an Enterprise Resource Planning (ERP) system.

15. A non-transitory machine-readable medium storing instructions which, when executed by one or more processors, cause the one or more processors to perform operations comprising:

obtaining a non-linear objective function designed to identify one or more subsets of entities containing numeric fields in tables of a first type that are likely to match an entity containing a numeric field in a table of a second type, wherein the tables of the first type store numeric data in a different format than the table of the second type;

converting the non-linear objective function to a linear objective function;

accessing a first entity in a first table of the second type, the first entity including a numeric field;

accessing a plurality of target entities in one or more tables of the first type, the plurality of target entities each including a numeric field;

executing, using a computer system, a neural network on the first entity and the plurality of target entities to produce a similarity score corresponding to each of one or more of the target entities, the similarity score indicating similarity of one or more numeric fields of a corresponding target entity to one or more numeric fields of the first entity, the neural network comprising an attend component decompose a problem into aligned subphrases, a compare component trained to compare the aligned subphrases, and an aggregate component trained to aggregate sets, and the neural network trained by jointly training the attend component, the compare component, and the aggregate component, the jointly training causing the attend component, the compare component, and the aggregate component to jointly learn relationships between numerical fields of tables of the first table and numerical fields of tables of the second type;

identifying, using the linear objective function, one or more subsets of the one or more target entities that are likely to match the first entity, based on the similarity score of each of the one or more target entities; and filtering the one or more subsets to obtain one or more inference results.

16. The non-transitory machine-readable medium of claim 15, wherein the neural network produces, for each likely matching subset, an average confidence score indicative of a likelihood that a corresponding subset matches the first entity.

17. The non-transitory machine-readable medium of claim 15, wherein a sum of the numeric fields of the target entities in each of the subsets is within a threshold amount of the numeric field of the first entity.

18. The non-transitory machine-readable medium of claim 15, wherein the converting includes creating a formulation that maximizes an auxiliary variable, the auxiliary variable being a lower bounds of the non-linear objective function.

19. The non-transitory machine-readable medium of claim 15, wherein the converting includes converting both the non-linear objective function to a linear objective function and converting non-linear constraints of the non-linear objective function to linear constraints of the linear objective function.

20. The non-transitory machine-readable medium of claim 15, wherein the executing further includes using a solver function contained in a software library to perform calculations on output of the neural network.

* * * * *